(12) United States Patent
Ehren et al.

(10) Patent No.: US 9,994,930 B2
(45) Date of Patent: Jun. 12, 2018

(54) PROCESS FOR PRODUCING LITHIUM CARBONATE FROM CONCENTRATED LITHIUM BRINE

(75) Inventors: Peter Ehren, La Serena (CL); Jose De Castro Alem, Salta (AR)

(73) Assignee: Orocobre Limited, Milton (AU)

( * ) Notice: Subject to any disclaimer, the term of this patent is extended or adjusted under 35 U.S.C. 154(b) by 836 days.

(21) Appl. No.: 14/344,216

(22) PCT Filed: Sep. 15, 2011

(86) PCT No.: PCT/AU2011/001189
§ 371 (c)(1),
(2), (4) Date: Jul. 11, 2014

(87) PCT Pub. No.: WO2013/036983
PCT Pub. Date: Mar. 21, 2013

(65) Prior Publication Data
US 2014/0334997 A1    Nov. 13, 2014

(51) Int. Cl.
*C22B 26/12*       (2006.01)
*C01D 15/08*       (2006.01)
*H01M 4/58*        (2010.01)

(52) U.S. Cl.
CPC ............. *C22B 26/12* (2013.01); *C01D 15/08* (2013.01); *H01M 4/5825* (2013.01)

(58) Field of Classification Search
None
See application file for complete search history.

(56) References Cited

U.S. PATENT DOCUMENTS 2,813,838 A * 11/1957 Lyman .................... B01J 41/00
                                                          210/902
4,124,684 A    11/1978 Olivier et al.
(Continued)

FOREIGN PATENT DOCUMENTS

CL    44767    12/2002
CL    41900     9/2003
(Continued)

OTHER PUBLICATIONS

Rongrui, C., "Application of Ion Exchange Technology in Boron Extraction," Tianjin Chemical Industry, 1992, Issue 2, pp. 32-37.
(Continued)

*Primary Examiner* — Melissa S Swain
(74) *Attorney, Agent, or Firm* — McCarter & English, LLP; Maria Laccotripe Zacharakis

(57) ABSTRACT

Disclosed are methods for a simplified process for preparing lithium carbonate from concentrated lithium brine which can be used for battery grade, pharmaceutical and other high purity grade applications. Impure lithium carbonate is precipitated from lithium concentrated brine, preferably lowered in magnesium, subsequently suspended in aqueous solution and reacted with carbon dioxide to form dissolved lithium bicarbonate. The insoluble impurities are filtered and the dissolved boron and metal impurities such calcium, magnesium and iron are physically separated from the lithium bicarbonate solution using ion selective mediums or other selective processes. Lithium carbonate is then subsequently precipitated.

27 Claims, 3 Drawing Sheets

(56) References Cited

U.S. PATENT DOCUMENTS

| | | | |
|---|---|---|---|
| 5,219,550 | A | 6/1993 | Brown et al. |
| 5,993,759 | A | 11/1999 | Wilkomirsky |
| 6,048,507 | A * | 4/2000 | Amouzegar ........... C01D 15/08 423/179.5 |
| 6,143,260 | A | 11/2000 | Boryta |
| 7,157,065 | B2 † | 1/2007 | Boryta |
| 7,449,161 | B2 * | 11/2008 | Boryta ................... C01D 15/04 423/179.5 |
| 7,811,457 | B2 † | 10/2010 | Marston |
| 8,287,829 | B2 | 10/2012 | Harrison et al. |
| 2001/0028871 | A1 * | 10/2001 | Harrison ................ C01D 15/08 423/421 |
| 2007/0148077 | A1 | 6/2007 | Boryta et al. |
| 2011/0200508 | A1 † | 8/2011 | Harrison |
| 2011/0300041 | A1 | 12/2011 | Galli et al. |
| 2011/0318253 | A1 | 12/2011 | Tiihonen |
| 2012/0263637 | A1 * | 10/2012 | Duyvesteyn ........ C01B 35/1054 423/283 |

FOREIGN PATENT DOCUMENTS

| | | |
|---|---|---|
| CL | 41981 | 1/2004 |
| CL | 44888 | 3/2009 |
| CL | 0098-02 | 9/2011 |
| EP | 876580 A1 | 11/1998 |
| WO | 2011082444 A1 | 7/2011 |

OTHER PUBLICATIONS

Guoqiang, Q. et al., "Reaction Between Boric Acid and Polyhydroxy Compounds and the Developments of Boron-Selective Resins," Ion Exchange and Adsorption, 1994, vol. 10, No. 4, pp. 375-382.

Xiao, Y. K. et al., "The Investigation of Ion Exchange Technique for Extracting Boron from Aqueous Fluids by Boron Specific Ion Exchange Resin," Journal of Salt Lake Science, 1997, vol. 5, No. 2, pp. 1-6.

Yajie, K. et al., "Extraction of Boric Acid from Brine by Ion Exchange," Inorganic Chemical Industry, 2006, vol. 38, No. 2, pp. 10-11 and 54.

International Search Report and Written Opinion for International Application No. PCT/AU2011/001189 dated Oct. 12, 2011.

Garrett, D.E., Handbook of Lithium and Natural Calcium Chloride, Their Deposits, Processing, Uses and Properties, 1st Edition, 2004, p. pp. 1-488, published by Academic Press.

Harben, W.P., Lithium Minerals and Compounds. In: The Industrial Minerals Handbook, 4th Edition, 2002, pp. 184-192, published by Industrial Minerals Information Ltd, UK.

LacCore, National Lacustrine Core Facility, Loss-on-Ignition Standard Operating Procedure, Nov. 11, 2003, pp. 1-5.

\* cited by examiner
† cited by third party

PROCESS FOR PRODUCING LITHIUM CARBONATE FROM CONCENTRATED LITHIUM BRINE

CROSS-REFERENCE TO RELATED PATENT APPLICATIONS

This application is a 35 U.S.C. § 371 national stage filing of International Application No. PCT/AU2011/001189, filed Sep. 15, 2011, the contents of which are incorporated herein by reference.

FIELD OF THE INVENTION

The present invention relates to an efficient and simple process for the production of lithium carbonate of high purity, from natural or artificial brines which normally have values of boron, calcium, magnesium, sulfates among others.

BACKGROUND

Although lithium is widely distributed on Earth, there are very few commercial sources where lithium is found in concentrated values suitable for producing lithium compounds. One main source is the mineral spodumene, which is a double lithium-aluminum silicate, LiAl(SiO3), which has a theoretical lithium content of 8.03%. Other minerals which are exploited are petalite, LiAl(Si$_4$O$_{10}$), which has a theoretical content of Li$_2$O of 4.88%, and lepidolite, which has a variable composition represented by the formula K$_2$(LiAl)$_3$(SiAl)$_4$O$_{10}$(OH,F)$_2$. Another mineral of high potential value for obtaining lithium is hectorite, which is a low grade mineral with the composition Na$_{0.33}$(Mg,Li)$_3$Si$_4$O$_{10}$(OH,F)$_2$ and which is not yet exploited for economic reasons.

Other sources for obtaining lithium, which have grown in importance in the last two decades, are the brines from salars, salt lakes, salt mines and geothermal resources. The highest lithium concentrations are found in salar deposits, which actually supply the majority of lithium to industry. The elements of major economic interest in salar type salt systems are lithium, potassium and boron. Important parameters for process development are:

a) the initial lithium concentration;
b) the Mg/Li ratio which reflects how much magnesium has to be removed by fractional crystallization or selective precipitation;
c) the Ca/Li ratio which indicates how much calcium has to be removed by fractional crystallization or selective precipitation;
d) the SO$_4$/Li ratio which indicates whether the deposit is a lithium sulfate deposit (high SO$_4$/Li) or a lithium chloride deposit (low SO$_4$/Li). With a high ratio, lithium sulfate salts start to precipitate at lithium concentrations typically between 0.5% to 1%.

In an evaporation process, calcium will concentrate together with magnesium and both have to be removed before lithium carbonate can be precipitated. When calcium concentrations are high, sulfate concentrations are low. Some typical components of naturally occurring brines are identified in the Table I below.

TABLE I

| Saline Brine Analysis (mg/l) | | | | | | | | | |
|---|---|---|---|---|---|---|---|---|---|
| Resource | Li | K | Mg | Ca | SO4 | B | Mg/Li | SO4/Li | Ca/Li |
| Salar de Atacama Average | 1,835 | 22,626 | 11,741 | 379 | 20,180 | 783 | 6.4 | 11.0 | 0.2 |
| Salar Salinas Grandes | 775 | 9,289 | 2,117 | 1,450 | 1,036 | 232 | 2.7 | 1.3 | 1.9 |
| Salar de Hombre Muerto | 744 | 7,404 | 1,020 | 636 | 10,236 | 420 | 1.4 | 13.8 | 0.9 |
| Salar de Hombre Muerto East Side | 745 | 8,318 | 1,781 | | 8,642 | | 2.4 | 11.6 | — |
| Silver Peak | 245 | 5,655 | 352 | 213 | 7,576 | 85 | 1.4 | 30.9 | 0.9 |
| Salar de Olaroz (production wells) | 774 | 6,227 | 2,005 | 416 | 18,630 | 1,136 | 2.6 | 24.1 | 0.5 |
| Salar de Cauchari | 618 | 5,127 | 1,770 | 476 | 19,110 | 1,360 | 2.9 | 30.9 | 0.8 |
| Salar de Uyuni Average | 424 | 8,719 | 7,872 | 557 | 10,342 | 242 | 18.6 | 24.4 | 1.3 |
| Salar de Rincón | 397 | 7,513 | 3,419 | 494 | 12,209 | 331 | 8.6 | 30.7 | 1.2 |
| Salar de Maricunga | 1,036 | 8,869 | 8,247 | 11,919 | 1,095 | 634 | 8.0 | 1.1 | 11.5 |

In the case of low Mg/Li brines, such as at Silver Peak, a process can be used in which magnesium is removed with slaked lime from fresh well brine or brine which is primarily concentrated in solar evaporation ponds. After the magnesium removal, the brine is concentrated to approximately 0.6% to 0.7% wt Li/wt brine, because at a higher concentration lithium sulfate salts will begin to precipitate. During the solar evaporation process principally sodium chloride together with some glaubersalt (Na$_2$SO$_4$.10H$_2$O), glaserite (Na$_2$SO$_4$.3K$_2$SO$_4$) and gypsum (CaSO$_4$.2H$_2$O) are crystallized. In the more concentrated ponds, silvinite (KCl.NaCl) salts crystallize, which is feedstock for the production of potassium chloride (KCl). The concentrated lithium brine is purified by a boron removal step. The removal step can be completed by the addition of a mixture of calcium chloride and slaked lime, by solvent extraction of boric acid or by a brine polishing stage. The remaining magnesium and calcium are removed from the brine by adding (i) caustic soda or sodium ash, (ii) a recycled lithium carbonate end liquor, (iii) a mixture of slaked lime and soda ash or (iv) a combination of any two or more of (i)-(iii). Subsequently, the brine is filtered and heated between 60 to 90° C. and a soda ash solution is added to precipitate lithium carbonate. The precipitated lithium carbonate is filtered washed and dried. This process produces a technical grade lithium carbonate (typically 99.0% wt Li$_2$CO$_3$) which is not suitable for the more exigent lithium battery industry or for pharmaceutical compositions that contain lithium carbonate.

At the Salar de Hombre Muerto, which is also a low Mg/Li brine, the brine is conditioned to the appropriate pH and temperature before it enters a sorption-desorption process where lithium, as lithium chloride (LiCl), is selectively recovered. The pregnant liquor contains approximately 0.16% wt Li/wt brine. Afterwards, the effluent is sent to the solar evaporation ponds where it is purified, concentrated and pH adjusted. If the brine reaches a concentration of 3% wt Li/wt brine, it is sent to the lithium carbonate process, where boron is removed with selective ion exchange. The remaining magnesium and calcium are removed from the brine with the addition of (i) sodium hydroxide and sodium carbonate, (ii) recycled lithium carbonate end liquor, (iii) a mixture of slaked lime and soda ash or (iv) a combination of any two or more of (i)-(iii). The brine is filtered and heated between 60 to 90° C. and a soda ash solution is added to precipitate lithium carbonate. The precipitated lithium carbonate (typically 99.5% wt $Li_2CO_3$), is filtered washed and dried. This process produces a battery grade of midrange purity.

The brines with higher Mg/Li ratios, such as at the Salar de Atacama, are pumped from the salar reservoir and are evaporated in large shallow pools, where a sequential crystallization of the salts commences. As the chloride brines are generally saturated with sodium chloride, the first salt to be precipitated is halite with some gypsum, followed by silvinite crystallization. Further evaporation leads to carnalite ($KCl.MgCl_2.6H_2O$) and then bischofite ($MgCl_2.6H_2O$) crystallization. At this stage, the lithium is increased to about 4.5% wt Li/wt brine with a magnesium content of about 4%. The evaporation of the brine continues forcing the crystallization of lithium carnalite ($LiCl.MgCl_2.6H_2O$), which is leached with less concentrated brine to recover part of the lithium content. The final lithium chloride brine contains about 6% wt Li/wt brine, 1.8% wt magnesium/wt brine, 0.8% wt boron/wt brine and some minor amounts of potassium, sodium and sulfate. Subsequently, the boron is removed as boric acid by solvent extraction. After the boron extraction, the brine is mixed with the lithium carbonate plant end liquor in order to precipitate most of the magnesium as magnesium carbonate. The brine is filtered and sent to the second stage of magnesium and calcium removal. In this second stage, a mixture of slaked lime and soda ash is added to the filtered brine in order to precipitate the magnesium as magnesium hydroxide and the calcium precipitates as calcium carbonate. The resulting sludge is filtered and the purified brine is sent to the lithium carbonate stage. Soda ash solution is added to the purified lithium brine in order to precipitate lithium carbonate. This reaction takes place at elevated temperatures normally between 60 to 90° C. Subsequently, the lithium carbonate (typically 99.4% wt $Li_2CO_3$), is filtered and the cake washed on a belt filter and finally dried. This process produces a battery grade of low range purity.

New brine deposits, with low Mg/Li and low sulfate brines (low. $SO_4$/Li), such as Salinas Grandes or relatively low sulfate brines as at the East Side Salar de Hombre Muerto, the lithium can be concentrated up to 6% wt Li/wt brine. Other brine deposits with high Mg/Li and high $SO_4$/Li, such as the sulfate brine in the Salar de Atacama, Salar de Uyuni, East and West Tanjinair Salt Lakes in China, and those with high Ca/Li brines such as Salar de Maricunga in Chile currently lack industrial application. Nevertheless, various process developments attempt to generate concentrated lithium brines suitable to precipitate lithium carbonate.

One process development involves using an additional process in which an impure feed of lithium carbonate ($Li_2CO_3$) is mixed with an aqueous solution and reacted with $CO_2$, preferably under pressure, to produce dissolved aqueous lithium bicarbonate ($LiHCO_3$). Insoluble impurities such as iron, magnesium and calcium are removed by physical means such as filtration or centrifugation. Soluble divalent or trivalent ions such as magnesium, calcium and iron are adsorbed by selective ion exchange or other similar methods. Carbon dioxide is then completely or partially removed by raising the solution temperature and/or releasing the pressure to enable pure $Li_2CO_3$ to precipitate. A part of the solution is returned to the bicarbonation reaction zone to enhance the economics of the process. Undesirable impurities remain in solution.

Although there are many ways to produce lithium carbonate from lithium containing brine, no simplified process exists to produce lithium carbonate of high purity, such as battery or pharmaceutical grade, from concentrated lithium brines that contain significant amounts of other values such as boron, magnesium, calcium, sodium, potassium, chloride and sulfate. Typical values for battery grade or pharmaceutical grade lithium carbonate are shown in Table II.

TABLE II

Typical values for Battery Grade or Pharmaceutical Grade Lithium Carbonate

| | Battery Grade (low) | Battery Grade (high) | Pharmaceutical Grade |
|---|---|---|---|
| $Li_2CO_3$ | 99.20 | 99.60 | 99.70 |
| Na | 0.060 | 0.018 | 0.003 |
| Fe | 0.002 | 0.0001 | 0.0003 |
| Ca | 0.040 | 0.005 | 0.01 |
| SO4 | 0.100 | 0.020 | 0.01 |
| K | 0.010 | 0.0004 | 0.001 |
| Cl | 0.010 | 0.002 | 0.001 |
| H2O | 0.400 | 0.193 | 0.05 |
| Mg | 0.010 | 0.002 | 0.001 |
| Cr | 0.0010 | 0.0002 | ND |
| Ni | 0.0030 | 0.0002 | ND |
| Cu | 0.0010 | 0.0002 | ND |
| Pb | 0.002 | 0.002 | ND |
| Heavy Metal (Pb) | 0.0020 | 0.0020 | 0.0002 |
| As | ND | ND | 0.0002 |
| Al | 0.005 | 0.0003 | ND |
| Zn | 0.005 | 0.0007 | ND |
| B | 0.001 | 0.0002 | ND |
| Mn | 0.0005 | 0.0003 | ND |
| Si | 0.005 | 0.0010 | ND |
| F | 0.010 | 0.0050 | ND |
| Insol. In HCl | 0.0030 | 0.0020 | 0.00 |
| LOI (550° C.) | 0.010 | 0.0050 | ND |

ND = No Data available

SUMMARY OF THE INVENTION

According to one embodiment of the present invention there is provided a method of producing lithium carbonate, comprising the steps of:

a) precipitating impure lithium carbonate from an impure lithium containing brine by addition of soda ash;

b) reacting the precipitate of impure lithium carbonate in a first aqueous solution with $CO_2$ to form a second aqueous solution containing dissolved $LiHCO_3$ and dissolved impurities and insoluble impurities from said impure lithium carbonate;

c) separating said insoluble impurities from said second aqueous solution;

d) separating said dissolved impurities from said second aqueous solution by contacting said dissolved impurities with one or more ion selective mediums to remove said dissolved impurities wherein at least one of the ion selective mediums removes boric acid and/or borates; and e) precipitating $Li_2CO_3$ from said second aqueous solution.

BRIEF DESCRIPTION OF FIGURES

The accompanying drawings show an illustrative flow sheet of the process of the present invention and solubility graphs of lithium expressed as a lithium carbonate equivalent in the lithium bicarbonation process.

FIG. 2 includes only one data point corresponding to the Orocobre solubility test conducted at 6° C. and 8 atm).

DETAILED DESCRIPTION

Figure 1:
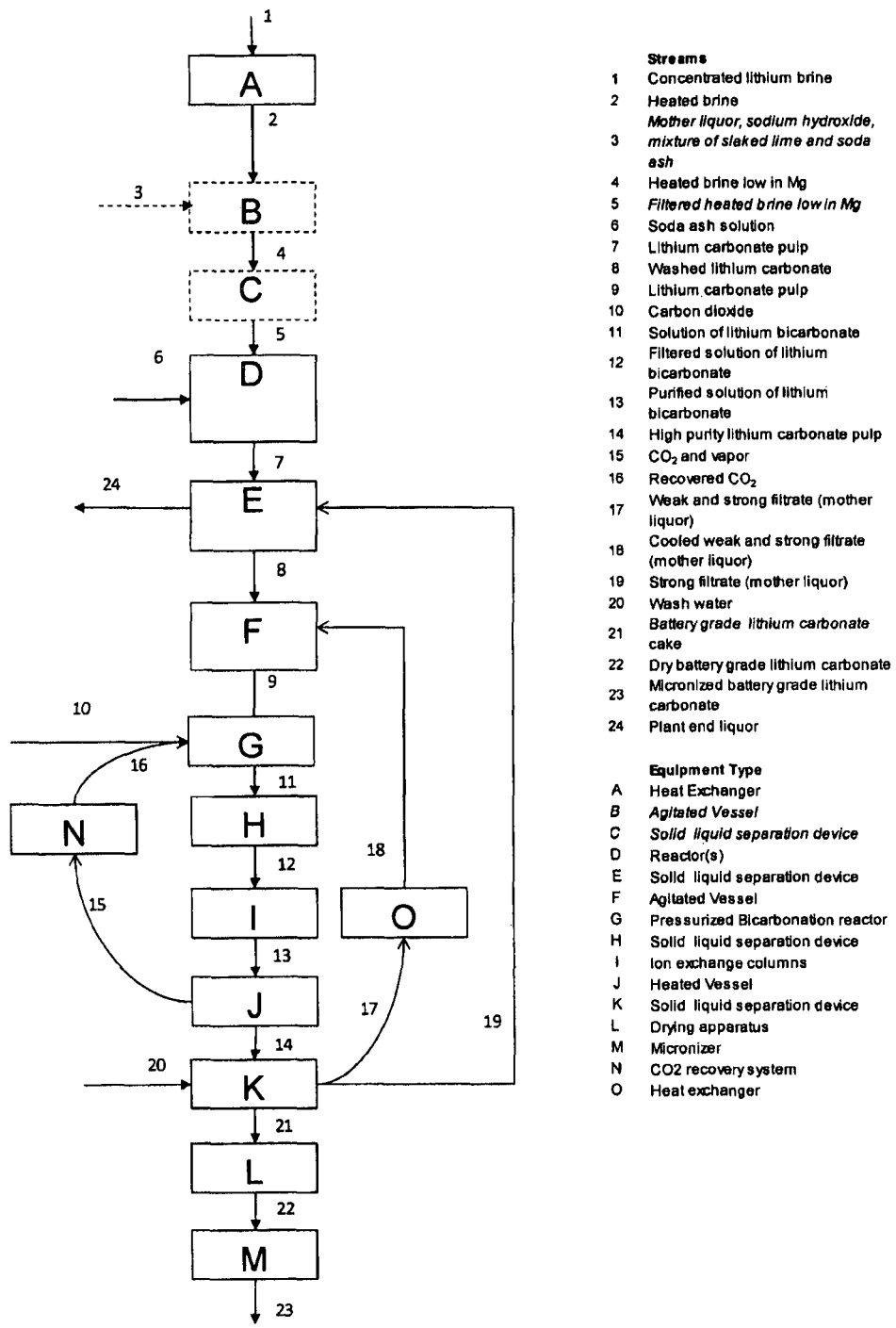
FIG. 1 schematically illustrates a flowchart of the possible steps involved in the present invention.

In order to fulfill battery grade and pharmaceutical grade specifications, processes for lithium carbonate production will likely require a purification process that, employs a lithium bicarbonation step. The present invention avoids the costly and complex boron removal step prior to lithium carbonate precipitation, by a simple ion exchange boron removal step in the recrystallization process. The amount of boron that needs to be removed by the process of the invention is only a fraction of the amount that needs to be removed when using a solvent extraction process, as only a portion of the boron co-precipitates with impure lithium carbonate when using the process of the present invention. For example, approximately 600 mg boron/kg $Li_2CO_3$ may only need to be removed when using the process of the present invention, whereas an amount of approximately 25,000-124,000 mg boron/kg $Li_2CO_3$ needs to be removed when using a process that includes a solvent extraction step to remove boron.

The present invention provides an efficient and economical process for the production of battery grade or pharmaceutical grade lithium carbonate from concentrated lithium containing brine with concentrations between 0.4% to 6.5% wt Li/wt brine, depending on the brine source. The impure brine is heated to a temperature between approximately 20 and 100° C. and, preferably, the amount of magnesium in the brine is reduced. Successively, a 15%-30% w/w soda ash solution is added to the filtered brine in order to precipitate impure lithium carbonate, which is then filtered and washed. The impure lithium carbonate is mixed with cooled mother liquor from a bicarbonation process. The slurry is sent to a reactor where it is reacted with a stoichiometric excess amount of $CO_2$ with respect to $LiHCO_3$, preferably under pressure between 0.7 and 20 atm, and between a temperature of approximately −12 to 40° C. to produce an aqueous solution with dissolved $LiHCO_3$. The lithium bicarbonate solution is filtered in order to remove the insoluble impurities, such as silica, iron, magnesium and calcium compounds. Soluble or partially soluble ions such as magnesium, calcium and other dissolved ions such as Fe, Ni, Cr, Cu, Pb, Cd, Al, Zn, Mn, Si and boron can be adsorbed by selective ion exchange resins or other similar methods. Other undesirable impurities such as Na, K, Cl and $SO_4$ remain in solution. Carbon dioxide is then completely or partially removed by raising the solution temperature between approximately 20 and 100° C. and/or releasing the pressure. By removing $CO_2$, $Li_2CO_3$ of battery grade or pharmaceutical grade precipitates, which is then filtered, washed and dried. The dried product is micronized according to size specifications. One fraction of the mother liquor resulting from the final precipitation step is returned to the bicarbonation reaction zone, another fraction is sent to wash the impure lithium carbonate obtained from the initial precipitation step to enhance the economics of the process.

The process of the invention will now be described with reference to the Figures. FIG. 1 schematically illustrates a flowchart of one embodiment of the present invention The concentrated lithium brine designated as stream (1) in FIG. 1, is the raw material for the process and varies between approximately 0.4% and 6.5% wt Li/wt brine depending on the source of the lithium containing brine and the process by which the brine is concentrated. If the magnesium levels in the brine are high, for example above 200 mg/l, magnesium can be removed before concentrating the brine, or the magnesium can be removed as magnesium hydroxide after the brine is concentrated but before precipitating impure lithium carbonate. The removal of magnesium as magnesium hydroxide can be done, for example, by the addition of (i) lithium carbonate plant end liquor (24) (ii) caustic soda, (iii) a mixture of slaked lime and soda ash or (iv) a combination of any two or more of (i)-(iii). In this case the brine has to be filtered to remove the magnesium hydroxide. The precipitation of magnesium hydroxide is preferably done at elevated temperatures between approximately 40 and 100° C.; by heating the brine designated as stream (2) in FIG. 1 using one or more heat exchangers (A). The precipitation of magnesium hydroxide occurs in a vessel (B) that is preferably slightly agitated. Co-precipitation of calcium carbonate may also occur at this stage. The brine (4) is then filtered with a solid liquid separation device (C) such as a press filter or a polishing filter. The filtrate (5) is heated to a temperature of between approximately 60 to 90° C.±(20° C.). In one embodiment, a soda ash solution (6) is added to the heated brine in one or more various agitated reactors (D) in order to precipitate impure lithium carbonate. Subsequently, the lithium carbonate pulp (7) is filtered and washed with mother liquor (19) from a bicarbonation process in a solid liquid separation device (E), preferably a belt filter or a peeler centrifuge. The lithium carbonate (8) is mixed in an agitated vessel (F) with a mixture of weak filtrate (mother liquor) and strong filtrate (18). This mixture (9) is fed to a bicarbonation reactor (G) at a temperature between approximately −15 to 40° C., preferably 0 to 25° C.±15° C., more preferably 5 to 15° C.±5° C., together with a carbon dioxide stream (10 & 16) at a pressure between 0.7 atm and 20 atm, but preferably between 1 and 8 atm for temperatures between about 0° C. and about 10° C. or between 8 and 15 atm for temperatures between 10 and 40° C. Bicarbonation can be carried out with an excess of carbon dioxide of up to 10 times the stoichiometric amount. For example, an excess of the stoichiometric amount of $CO_2$ with respect to $LiHCO_3$ can be between 1 and 10, preferably between 1 and 2, more preferably between 1 and 1.3. Under these conditions, dispersed lithium carbonate is transformed into lithium bicarbonate ($LiHCO_3$) soluble in the aqueous solution according to the following reaction.

$Li_2CO_3(s)+H_2O(l)+CO_2(g) \Rightarrow 2LiHCO_3(aq)$  (reaction scheme a)

Figure 2:
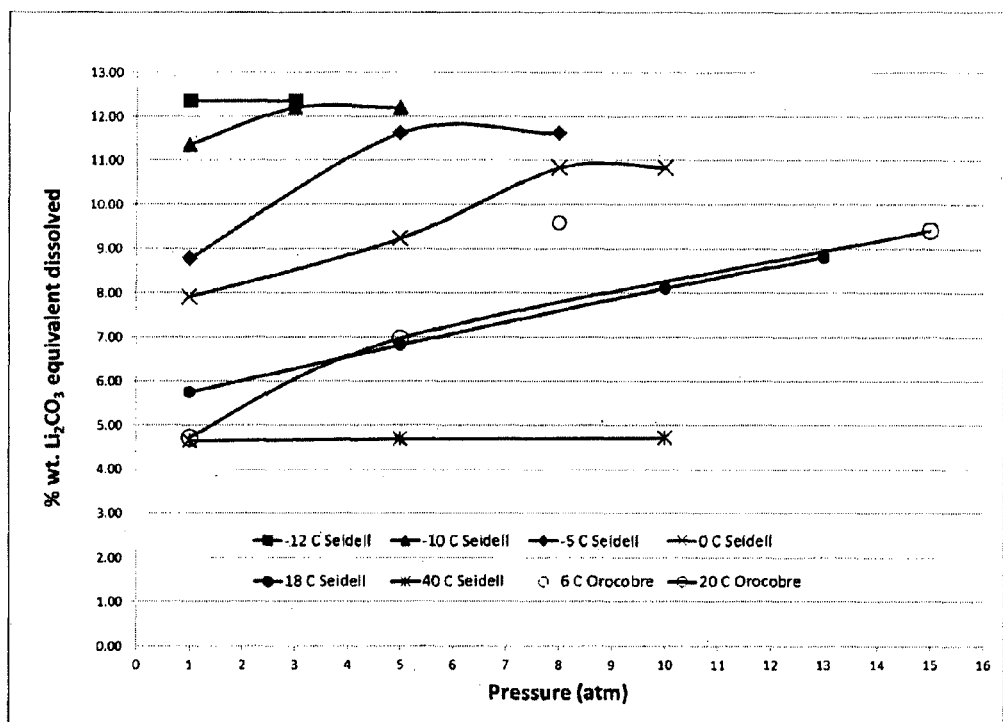
FIG. 2 is a graph of total concentration of $Li_2CO_3$ that can be solubilized as $LiHCO_3$ as a function of the pressure $CO_2$ at particular temperatures. Data points labeled as 'Seidell' are taken from page 385 of Volume II of Solubilities, Inorganic and Metal Organic Compounds: A compilation of solubility data from the periodical literature, gathered by Atherton Seidell and William F. Linke, 4th edition, published by Van Nostrand, 1958 Data points labeled 'Orocobre' in FIG. 2 are data acquired by autoclave lab scale solubility tests that were performed at the test facilities installation of the company SGS Group in Lakefield, Canada. The labels display the temperature conditions of either the Orocobre experiments or the temperature conditions published by Seidell and Linke.

Impurities such as iron, calcium and magnesium remain either totally insoluble or partially insoluble after bicarbonation. The maximum solubility of $LiHCO_3$ expressed as lithium carbonate equivalent is increased at lower temperature and at higher partial pressure of carbon dioxide in the vessel as can be observed in FIG. 2. A slight excess of carbon dioxide is preferred to ensure complete dissolution of the lithium carbonate. The solution containing the dissolved lithium bicarbonate (11) is fed through a solid liquid separation device (H) such as press filter or a polishing filter at the same pressure as used during the bicarbonation reaction to remove insoluble or partly insoluble compounds such as iron, calcium, magnesium, carbonates, hydroxides and borates as well as silicate and aluminate species. For example in the case where there is significant presence of magnesium and/or calcium the filtered solution (12) can then be fed to one or more ion exchange columns (I) or other selective method, such as liquid-liquid extraction that employs:
  a) one type of resin or fiber with an aminophosphonic acid functional group (—CH2-NH—CH2-$PO_3Na_2$) such as, but not limited to, AMBERLITE™ IRC747, Purolite S-940, Purolite S-950, Durolite C-467; and/or with a iminodiacetic acid functional group such as, but not limited to, AMBERLITE™ IRC748, Lewatit MonoPlus TP 207 and Purolite S-930 in order to remove one or more of the following magnesium, calcium and other ions such as Fe, Ni, Cr, Cu, Cd, Pb, Al, Zn, Mn, As and Si present in trace quantities; and/or
  b) one type of resin or fiber with a N-methyl-glucamine functional group, such as, but not limited to, AMBERLITE™ IRA743, AMBERLITE™ PWA10, Purolite S108 and Purolite S110, Lewatit MK in order to remove boric acid and borates from filtered solution (12).

Figure 3:
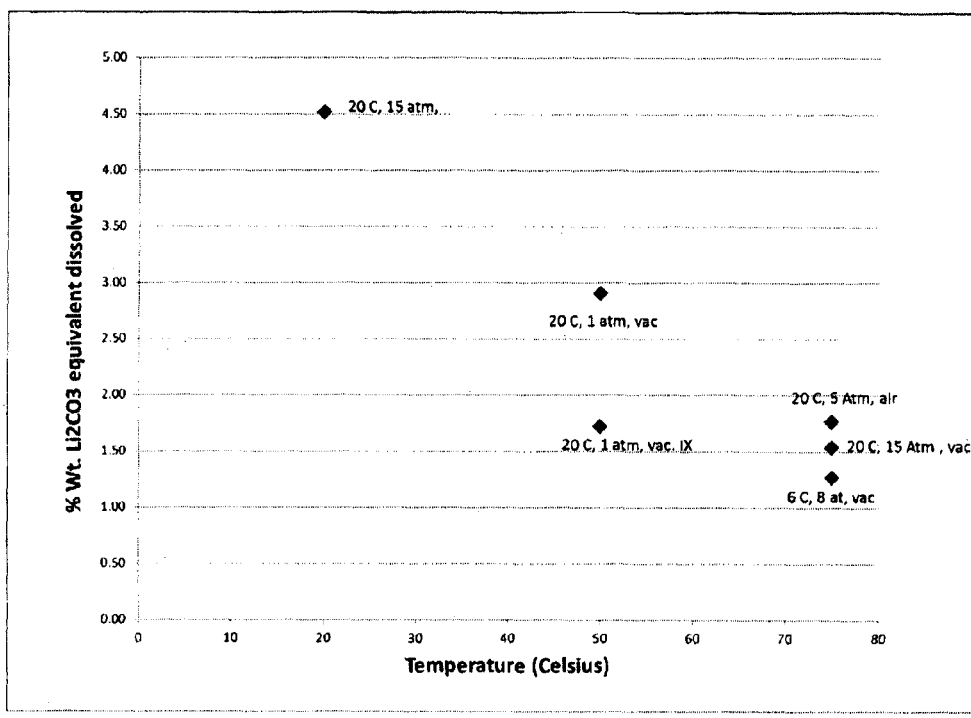
FIG. 3 is a graph of total concentration of $Li_2CO_3$ at particular temperatures after temperature rise and and/or pressure release in order to desorb $CO_2$. The labels next to the solubility points indicate the bicarbonation conditions such as temperature and pressure. At the right side of the label the precipitation conditions are indicated, such as vacuum application (vac), air sparging (air) or ion exchange (IX) treatment.

The purified lithium bicarbonate solution (13) having low levels of Mg (<100 ppm), Ca (<20 ppm), B (<100 ppm), Fe (<20 ppm) and other dissolved ions (all less than <20 ppm) is heated in a vessel (J) to a temperature of approximately 50 to 70° C.±20° C., more preferably 60 to 80° C.±10° C., even more preferably 65 to 75° C.±5° C. to precipitate lithium carbonate as can be seen in FIG. 3 and at a pressure that can less than the pressure applied in the bicarbonation reaction. The pressure applied can be between vacuum and 20 atm, but preferably between vacuum and 1 atm. As the lithium carbonate is precipitated, the carbon dioxide is released from vessel (J) which is preferably agitated, according to reaction scheme (b) shown below.

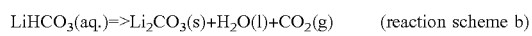

$LiHCO_3(aq.) \Rightarrow Li_2CO_3(s)+H_2O(l)+CO_2(g)$  (reaction scheme b)

The released carbon dioxide is evacuated through line (15), by a carbon dioxide recovery system (N) where it is cooled, dried and recompressed for reuse in the bicarbonation reactor. Alternatively, it can be released to the atmosphere.

Under these conditions, pure lithium carbonate (>99.6%) precipitates, whereas ions such as sodium, potassium and sulfate remain soluble in the solution. The pure lithium carbonate solids in suspension is recovered by a solid liquid separation device (K), preferably a belt filter or a peeler centrifuge, and the resulting filter cake is washed, preferably with de-ionized water (20). The washed lithium carbonate (21) is dried in a suitable drying apparatus (L) and then micronized according to size specifications in a milling device (M). The liquid stream (17) containing a mixture of strong and weak filtrate, also named washing water, is sent to heat exchanger (O) where it is cooled (18), and subsequently fed back to the vessel (F). A bleed stream of strong filtrate (19) is sent preferably to solid liquid separation device (E) in order to wash impure lithium carbonate.

The bicarbonation process can be carried out batch wise or continuously. In the case of a continuous process, the bicarbonation reaction occurs in a reactor or a series of reactors or a pipe-line reactor (G) which ensures a thorough mixing of the gas, liquid and solid phases. With the operating temperatures between 10 and 40° C. the reactor is operated preferably between 8 to 15 atmospheres and when operating temperatures between −15 and 10° C. the reactor is preferably operated at 0.7 and 8 atmospheres. Similarly, the precipitation of pure lithium carbonate can be carried out in one or a series of reactors (J) that can be operated at a wide temperature range. The temperature used when precipitating lithium carbonate in reactor (J) is higher than the temperature used during the bicarbonation reaction in reactor (G). The pressure used when precipitating lithium carbonate in reactor (J) can be lower than the pressure used during the bicarbonation reaction in reactor (G). One or more of the reactors (J) should preferably include strong agitation means to assist with the liberation of carbon dioxide. Operation of one or more of the reactors (J) under vacuum or equally sparged with a gas such as air, can also assist with the liberation of carbon dioxide gas.

Once the ion exchange resins are saturated they have to be regenerated. The regeneration involves first washing with water, then treatment with diluted hydrochloric acid or diluted sulfuric acid to displace ions from the resin. The resin is then washed with water and regenerated with sodium hydroxide, potassium hydroxide or lithium hydroxide solution.

Spent hydrochloric acid or sulfuric acid solution used for regeneration of the spent ion-exchange resin becomes contaminated with both lithium and calcium ions and can be recycled and used a number of times before it needs to be replaced and finally it can be sent to the concentrated well brine in solar ponds in order to recover the lithium values.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in this specification individually or collectively, and any and all combinations of any two or more of said steps or features.

The present invention will now be described with reference to the following non-limiting examples.

Example I

A lithium containing brine was pumped from the well field of the Salar de Olaroz, located in Argentina. The brine was treated with slaked lime in order to remove the magnesium as magnesium hydroxide with a co-precipitation of calcium sulfate. Subsequently the brine was concentrated in solar evaporation ponds until a concentration of 0.65% wt lithium/wt brine was obtained from the test facilities at Salar de Olaroz. Impure brine with 0.65% wt lithium/wt brine was used as starting material for the lithium carbonate production at a lab scale according to the present invention. This brine was heated at 70° C. at 1 atm and a 25% w/w soda ash solution was added to precipitate impure lithium carbonate. The impure lithium carbonate was filtered and washed with deionized water.

The impure lithium carbonate was mixed with water and sent to a reactor where it was dissolved with a 30% excess of the stoichiometric amount of $CO_2$ with respect to $LiHCO_3$ at atmospheric pressure and 18° C. in order to produce an aqueous solution with dissolved $LiHCO_3$. The generated solution was filtered in order to remove the insoluble impurities such as silica, iron, magnesium, calcium and boron compounds. The filtered solution was split. One half was heated at 75° C. at 1 atm in order to release the carbon dioxide and to precipitate $Li_2CO_3$, which was filtered, washed with deionized water and dried at 110° C. The other half was passed through ion exchange column with AMBERLITE™ IRC747 and subsequently passed through ion exchange column with AMBERLITE™ IRC748 in order to polish the solution and remove the final traces of magnesium, calcium and other dissolved ions. The solution was then passed through an ion exchange column with AMBERLITE™ IRA743 to remove boric acid and borates from the solution. The purified solution was heated at 75° C. at 1 atm in order to release the carbon dioxide and to precipitate $Li_2CO_3$ which was filtered, washed with deionized water and dried at 110° C. Results for the impure and pure lithium carbonate of the test are showed in Table III

TABLE III

Chemical analysis in weight percent.

|  | B % wt | Ca % wt | Mg % wt |
| --- | --- | --- | --- |
| Impure lithium brine | 0.460 | 0.007 | 0.016 |
| Impure lithium carbonate | 0.050 | 0.292 | 0.047 |
| Lithium carbonate without Ion Exchange | 0.002 | 0.041 | 0.774 |
| Lithium carbonate with Ion Exchange | 0.0001 | 0.008 | 0.005 |

Example II

A lithium containing brine was pumped from the well field of the Salar de Olaroz, located in Argentina. The brine was treated with slaked lime in order to remove the magnesium as magnesium hydroxide with a co-precipitation of calcium sulfate. Subsequently, the brine was concentrated in solar evaporation ponds until a concentration of 0.69% wt lithium/wt brine was obtained. This brine was used as starting material for the lithium carbonate production process of the present invention. The results of chemical analysis of the concentrated brine is shown in Table IV.

TABLE IV

Chemical analysis for lithium containing brine

| Chemical Species | Brine Content (% wt) |
| --- | --- |
| Li | 0.69 |
| Na | 7.73 |
| K | 4.05 |
| Mg | 0.001 |
| Ca | 0.018 |
| B | 0.382 |
| $SO_4$ | 3.11 |

In the pilot plant, the brine was heated at 75° C., subsequently a 28% w/w soda ash solution was added in order to precipitate impure lithium carbonate. The impure lithium carbonate was filtered and washed with deionized water. The impure lithium carbonate was mixed with cooled mother liquor from bicarbonation process. The slurry was heated to a temperature of 18° C. in a reactor (G) where it was dissolved with an 20% excess of the stoichiometric amount of $CO_2$ with respect to $LiHCO_3$ at a pressure of 1 atm in order to produce an aqueous solution with dissolved $LiHCO_3$. The resulting solution with a temperature of 18° C. was filtered (H) in order to remove the insoluble impurities, such as silica, iron, magnesium and calcium compounds. Soluble or partly soluble ions such as magnesium, calcium, other dissolved metals and boron were adsorbed by selective ion exchange resin (I). The filtered solution with a temperature of 18° C. and at atmospheric pressure was passed through ion exchange column with AMBERLITE™ IRC747 and subsequently passed through ion exchange column with AMBERLITE™ IRC748 in order to polish the solution and remove the final traces of magnesium, calcium and other dissolved metals. The solution with a temperature of 18° C. and at atmospheric pressure was then passed through an ion exchange column with AMBERLITE™ IRA743 to remove boric acid and borates from the solution. The purified solution was heated at 75° C. in a strongly agitated reactor (J) at atmospheric pressure in order to release the carbon dioxide and precipitate $Li_2CO_3$ which was filtered and washed in a pan filter (K) with hot distilled water and then dried at 110° C. The filtered liquor was recycled back to the bicarbonation process. Results for the impure and pure lithium carbonate of the test are showed in Table V.

TABLE V

Chemical analysis for lithium carbonate

|  | Unit | Impure lithium carbonate | Pure lithium carbonate |
| --- | --- | --- | --- |
| $Li_2CO_3$ | % | 97.81 | 99.91 |
| Na | ppm | 2200 | 7.6 |
| Fe | ppm | 4.8 | 0.7 |
| Ca | ppm | 3200 | 30 |
| $SO_4$ | ppm | 2600 | 70 |
| K | ppm | 540 | 1.1 |
| Cl | ppm | 600 | <50 |
| Mg | ppm | 370 | 8 |
| Cr | ppm | <0.5 | <0.5 |
| Ni | ppm | <0.5 | <0.5 |
| Cu | ppm | <0.5 | <0.5 |

TABLE V-continued

Chemical analysis for lithium carbonate

| | Unit | Impure lithium carbonate | Pure lithium carbonate |
|---|---|---|---|
| Pb | ppm | <0.5 | <0.5 |
| Al | ppm | <5 | <5 |
| Zn | ppm | 0.8 | <0.5 |
| B | ppm | 680 | <0.5 |
| Si | ppm | 20 | <10 |
| $H_2O$ | % | <0.5 | <0.5 |
| Insolubles in HCl | % | <0.5 | <0.5 |
| LOI (loss of ignition) | % | 0.1 | <0.05 |

Example III

The bicarbonation process was conducted at different temperatures and pressures in order to define lithium bicarbonate solubility as function of these parameters. Test T1 through T3 were each conducted under an atmosphere of $CO_2$ gas. T4 test was conducted at atmospheric pressure. T1, T2 and T4 were conducted at 20° C. and T3 at 6° C. T1 was conducted in a 2 liter stainless steel Parr autoclave. T2, T3 and T4 were conducted in a 4 liter titanium Parr autoclave. The reaction slurry of test T4 was sparged with $CO_2$ gas in glass reactor. In all samples a 10 percent excess of lithium carbonate and $CO_2$ gas was added in order to assure the saturation of lithium bicarbonate. The reactors were operated until a constant pH was obtained. The test conditions are given in Table VI and the results are plotted FIG. 2.

TABLE VI

Bicarbonation process test conditions

| Test Number | Temperature (° C.) | Pressure (atm) |
|---|---|---|
| T1 | 20 | 5 |
| T2 | 20 | 15 |
| T3 | 6 | 8 |
| T4 | 20 | 1 |

Example IV

The solutions from said test T1-T4 in Example III were used as feed material for the lithium carbonate precipitation tests from the lithium bicarbonate solution by releasing CO2 gas. The tests were conducted in a standard 2 L Pyrex™ glass reactor. A wide temperature range between 20 and 75° C. was tested. In order to improve $CO_2$ gas release, all tests were conducted with strong agitation, most of the tests with the exception of the T1a and T2a were conducted at a reduced pressure of approximately 0.4 to 0.5 atmospheres and at test T1a air sparging was applied. The bicarbonate solution of T4 was treated by an ion exchange step with ion exchange resin IRC748 before being applied in test T4a. The test conditions are shown in Table VII and the lithium carbonate solubility results are plotted in FIG. 3.

TABLE VII

Lithium carbonate precipitation test conditions

| Test Number | Solution from Test | Temperature | Conditions | Residence Times |
|---|---|---|---|---|
| T1a | T1 | 75 | 1 Atm. with air sparging | 4 |
| T2a | T2 | 75 | 1 Atm. | 4 |
| T2b | T2 | 20 | reduced pressure | 6 |
| T3a | T3 | 75 | reduced pressure | 4 |
| T4a | T4 | 50 | IX - reduced pressure | 4 |
| T4b | T4 | 50 | reduced pressure | 4 |

The invention claimed is:

1. A method of producing lithium carbonate, comprising the steps of:
   a) precipitating impure lithium carbonate from a lithium containing impure brine by addition of soda ash, wherein the lithium containing impure brine contains approximately between 0.4-6.5% wt Li/wt brine;
   b) reacting the precipitate of impure lithium carbonate-in a first aqueous solution with $CO_2$ to form a second aqueous solution containing dissolved $LiHCO_3$ and dissolved impurities and insoluble impurities from said impure lithium carbonate;
   c) separating said insoluble impurities from said second aqueous solution;
   d) separating said dissolved impurities from said second aqueous solution by contacting said dissolved impurities with one or more ion selective mediums to remove said dissolved impurities wherein at least one of the ion selective mediums removes boric acid and/or borates; and
   e) precipitating $Li_2CO_3$ from said second aqueous solution;

wherein boron is not removed from the impure brine prior to lithium carbonate precipitation.

2. The method according to claim 1, wherein said reacting step (a) to form impure lithium carbonate from the lithium containing brine is carried out at a temperature of approximately between 20 and 100° C.

3. The method according to claim 1, wherein said impure lithium carbonate precipitate of step (a) is separated using a solid-liquid device.

4. The method according to claim 1, wherein said impure lithium carbonate is reacted with $CO_2$ at a temperature of between approximately −15° C. to 40° C.

5. The method according to claim 1, wherein said temperature is approximately between 5 to 15° C.±5° C.

6. The method according to claim 1, wherein said impure lithium carbonate is reacted with $CO_2$ at a pressure between approximately 0.7 atm and 20 atm.

7. The method according to claim 1, wherein said impure lithium carbonate is reacted with $CO_2$ at a pressure between approximately 1 and 8 atm at a temperature between approximately 0 and 10° C.

8. The method according to claim 1, wherein said impure lithium carbonate is reacted with $CO_2$ at a pressure between approximately 8 and 15 atm at a temperature between approximately 10 and 40° C.

9. The method according to claim 1, wherein said impure lithium carbonate is reacted with an excess of the stoichiometric amount of $CO_2$ with respect to $LiHCO_3$.

10. The method according to claim 9, wherein said excess of $CO_2$ is between approximately 1 and 10 times the stoichiometric amount needed.

11. The method according to claim 9, wherein said excess of $CO_2$ is between approximately 1 and 2 times the stoichiometric amount needed.

12. The method according to claim 9, wherein the excess of $CO_2$ is between approximately 1 and 1.3 times the stoichiometric amount needed.

13. The method according to claim 1, wherein said dissolved impurities include ions selected from the group consisting of Ca, Mg, Fe, Cr, Pb, Cd, As, Al, Ni, Cu, Zn, Mn, Si and a combination thereof.

14. The method according to claim 1, wherein said one or more ion selective medium is an ion exchange resin or fiber.

15. The method according to claim 14, wherein said resin or fiber has an aminophosphonic acid functional group.

16. The method according to claim 14, wherein said resin or fiber has an iminodiacetic acid functional group.

17. The method according to claim 14, wherein a resin or fiber having an aminophosphonic acid functional group and a resin or fiber having an iminodiacetic acid functional group can be used in series.

18. The method according to claim 1 wherein said boric acid and/or borates is removed by an ion exchange resin or fiber having a N-methyl-glucamine functional group.

19. The method according to claim 1, wherein said precipitation step (e) of lithium carbonate is carried out at a temperature between approximately 20° C. and 100° C.

20. The method according to claim 19, wherein said temperature is between approximately 50 to 70° C.±20° C.

21. The method according to claim 19, wherein said temperature is between approximately 60 to 80° C.±10° C.

22. The method according to claim 19, wherein said temperature is between approximately 65 to 75° C.±5° C.

23. The method according to claim 1, wherein said precipitation step (e) of lithium carbonate is carried out at a pressure between vacuum and 20 atm.

24. The method according to claim 23, wherein said pressure is between vacuum and 1 atm.

25. The method according to claim 1, wherein said steps are carried out continuously or in batch mode.

26. The method according to claim 1, wherein said lithium carbonate precipitated from said second aqueous solution in step (e) has a chemical analysis profile as shown below:

|  | % wt |
|---|---|
| $Li_2CO_3$ | >99.20 |
| Na | <0.060 |
| Fe | <0.002 |
| Ca | <0.040 |
| SO4 | <0.100 |
| K | <0.010 |
| Cl | <0.010 |
| H2O | <0.400 |
| Mg | <0.010 |
| Cr | <0.0010 |
| Ni | <0.0030 |
| Cu | <0.0010 |
| Pb | <0.002 |
| Al | <0.005 |
| Zn | <0.005 |
| B | <0.001 |
| Mn | <0.0005 |
| Si | <0.005 |
| F | <0.010 |
| Insolubles of $Li_2CO_3$ in HCl | <0.0030 |
| Loss of ignition (LOI) of $Li_2CO_3$ (550° C.) | <0.010. |

27. The method according to claim 1, wherein said lithium carbonate precipitated from said second aqueous solution in step (e) has a chemical analysis profile as shown below:

| | | |
|---|---|---|
| $Li_2CO_3$ | wt % | 99.91 |
| Na | ppm | 7.6 |
| Fe | ppm | 0.7 |
| Ca | ppm | 30 |
| SO4 | ppm | 70 |
| K | ppm | 1.1 |
| Cl | ppm | <50 |
| Mg | ppm | 8 |
| Cr | ppm | <0.5 |
| Ni | ppm | <0.5 |
| Cu | ppm | <0.5 |
| Pb | ppm | <0.5 |
| Al | ppm | <5 |
| Zn | ppm | <0.5 |
| B | ppm | <0.5 |
| Si | ppm | <10 |
| H2O | % | <0.5 |
| Insolubles of $Li_2CO_3$ in HCl | % | <0.5 |
| Loss of ignition (LOI) of $Li_2CO_3$ | % | <0.05. |

* * * * *